US008909565B2

(12) United States Patent
Paek et al.

(10) Patent No.: US 8,909,565 B2
(45) Date of Patent: Dec. 9, 2014

(54) CLUSTERING CROWDSOURCED DATA TO CREATE AND APPLY DATA INPUT MODELS

(75) Inventors: Timothy Seung Yoon Paek, Sammamish, WA (US); Itai Almog, Redmond, WA (US); Ganapathy Raman, Redmond, WA (US); Eric Norman Badger, Redmond, WA (US); Chit Wei Saw, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 390 days.

(21) Appl. No.: 13/361,941

(22) Filed: Jan. 30, 2012

(65) Prior Publication Data

US 2013/0198115 A1 Aug. 1, 2013

(51) Int. Cl.
G06N 5/02 (2006.01)
G06F 15/18 (2006.01)

(52) U.S. Cl.
USPC .............................................. 706/12; 706/46

(58) Field of Classification Search
CPC ... G06F 15/18; G06F 3/04886; G06F 3/0237; G06F 17/20; G06N 5/02
USPC ..................................................... 706/12, 46
See application file for complete search history.

(56) References Cited

U.S. PATENT DOCUMENTS

| | | | |
|---|---|---|---|
| 7,890,526 B1 | 2/2011 | Brewer et al. | |
| 2003/0131069 A1* | 7/2003 | Lucovsky et al. | 709/217 |
| 2004/0153373 A1* | 8/2004 | Song et al. | 705/26 |
| 2007/0100890 A1* | 5/2007 | Kim | 707/104.1 |
| 2010/0259561 A1 | 10/2010 | Forutanpour et al. | |
| 2010/0315266 A1 | 12/2010 | Gunawardana et al. | |
| 2011/0083167 A1 | 4/2011 | Carpenter et al. | |
| 2011/0099506 A1* | 4/2011 | Gargi et al. | 715/773 |
| 2011/0202876 A1* | 8/2011 | Badger et al. | 715/816 |
| 2011/0246575 A1* | 10/2011 | Murayama et al. | 709/204 |
| 2012/0042006 A1* | 2/2012 | Kiley et al. | 709/203 |
| 2012/0047454 A1* | 2/2012 | Harte | 715/773 |
| 2012/0264516 A1* | 10/2012 | Rudchenko et al. | 463/36 |

OTHER PUBLICATIONS

Hofer T. et al., "Context-Awareness on Mobile Devices—the Hydrogen Approach", Proceedings of the 36th Hawaii International Conference on System Sciences, 2003.*
Woerndl W. et al., "Context-Aware Recommender Systems in Mobile Scenarios", 2009.*
Kamvar M. et al., "The Role of Context in Query Input: Using contextual signals to complete queries on mobile devices", ACM, 2004.*

(Continued)

*Primary Examiner* — Jeffrey A Gaffin
*Assistant Examiner* — Dave Misir
(74) *Attorney, Agent, or Firm* — Timothy Churna; Kate Drakos; Micky Minhas

(57) ABSTRACT

The collection and clustering of data input characteristics from a plurality of computing devices is provided. The clustered data input characteristics define user groups to which users are assigned. Input models such as language models and touch models are created for, and distributed to, each of the user groups based on the data input characteristics of the users assigned thereto. For example, an input model may be selected for a computing device based on a current context of the computing device. The selected input model is applied to the computing device during the current context to alter the interpretation of input received from the user via the computing device.

20 Claims, 6 Drawing Sheets

(56) References Cited

OTHER PUBLICATIONS

Flanagan J. "Context Awareness in a Mobile Device: Ontologies Versus Unsupervised/Supervised Learning", 2005.*

Rudchenko, et al., "Text Text Revolution: A Game that Improves Text Entry on Mobile Touchscreen Keyboards", Retrieved at <<http://research.microsoft.com/en-us/um/people/timpaek/papers/pervasive11.pdf>>,Proceedings of 9th International Conference on Pervasive Computing, Jun. 2011, pp. 8.

Ouk, et al., "A Word-based Predictive Text Entry Method for Khmer Language", Retrieved at http://ieeexplore.ieee.org/stamp/stamp.jsp?tp=&arnumber=4583032>>,Jul. 13-15, 2008, pp. 214-219.

Andrews, et al., "Recent Developments in Document Clustering", Department of Computer Science, Virginia Tech, Oct. 16, 2007, pp. 25.

* cited by examiner

CLUSTERING CROWDSOURCED DATA TO CREATE AND APPLY DATA INPUT MODELS

BACKGROUND

Typing text on small physical or virtual keyboards is difficult and can be frustrating for a user. Existing systems use input models such as touch models (e.g., hit-target resizing) and language models, spell correction, auto-completion, grammar collection, and other intelligence solutions to interpret the data entered by the user. To build accurate and comprehensive input models, significant input data from the user is required. For example, to build a touch model, user touch points are collected and compared to the intended character targets. To build a language model, word and grammar data is collected. Collecting such data to build the input models, however, can be time-consuming and burdensome for the user. With some existing systems, improving the data entry experience for the user occurs slowly over time as additional data is collected and processed.

SUMMARY

Embodiments of the disclosure enable the dynamic and contextual creation, selection, and application of input models such as language models and touch models for a computing device. Data input characteristics are collected from a plurality of users of computing devices. A plurality of user groups are defined based on the collected data input characteristics, and each of the users is assigned to at least one of the user groups. Input models are created for each of the user groups and provided to the assigned users within the user groups.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
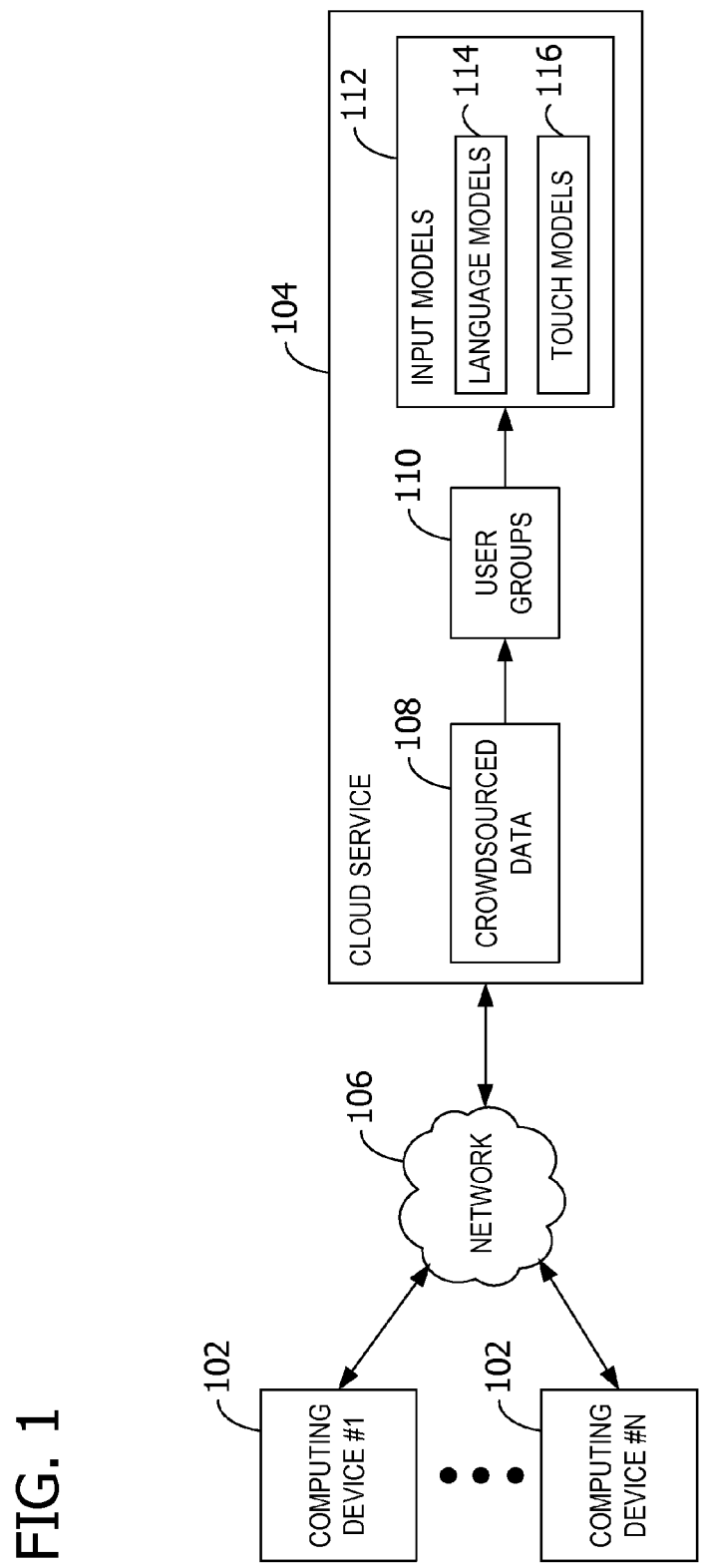
FIG. 1 is an exemplary block diagram illustrating a cloud service communicating with a plurality of computing devices to create a plurality of input models.

Referring to the figures, embodiments of the disclosure enable the collection and clustering of data input characteristics to define and apply data input models 112. Aspects of the disclosure further enable the dynamic and automatic adjustment of input models 112 based on context of a computing device 102.

In some embodiments, the data input characteristics are collected by a cloud service 104 from a plurality of computing devices 102 (e.g., mobile computing devices 502). The cloud service 104 performs a data feedback loop by receiving the data input characteristics, creating the input models 112, and then pushes or distributes the created input models 112 to computing devices 102 based on a current context of each of the computing devices 102. While described herein with reference to language models 114 and/or touch models 116, aspects of the disclosure are operable with any mobile typing intelligence models.

Referring next to FIG. 1, an exemplary block diagram illustrates the cloud service 104 communicating with a plurality of computing devices 102 to create a plurality of input models 112. In the example of FIG. 1, the computing devices 102 include computing device #1 through computing device #N. The computing devices 102 and the cloud service 104 communicate via a network 106 such as the Internet, although any network is contemplated. As further described with reference to FIG. 3 below, the computing devices 102 include any devices capable of performing the operations implementing aspects of the disclosure.

In some embodiments, the cloud service 104 represents an aggregation of computing hardware and/or software providing functionality to at least one of the computing devices 102. For example, the cloud service 104 may provide storage services, processing services, and the like to the computing devices 102. In other embodiments, the cloud service 104 represents a server providing functionality to the computing devices 102. In still other embodiments, the cloud service 104 represents a peer device to the computing devices 102.

The cloud service 104 receives, observes, aggregates, and/or collects data input characteristics from the computing devices 102. Exemplary data input characteristics include, but are not limited to, language (e.g., English), locale of the computing device 102 (e.g., North America), location of the computing device 102 (e.g., latitude/longitude), input type (e.g., keyboard, touchpad, mouse, microphone), how fast a user 202 is typing, text that was auto-corrected but undone by the user 202, text that was replaced by the user 202 with an input method editor (IME) suggestion, text that was selected by the user 202 as a word completion to characters entered by the user 202, characters entered by the user 202, strokes entered by the user 202 (e.g., for certain languages relying on strokes rather than characters), words that the user 202 manually entered into a dictionary, touch point data (e.g., where the user 202 contacts the computing device 102 for data entry), data entry field type (e.g., date field, subject field, etc.), application 308, time of day, day of week, previous application 308 executed, and the like. Additional exemplary data input characteristics include physical aspects of the user 202 such as hand size, right-hand or left-hand dominance, fingertip touch entry or fingernail touch entry, and the like. In general, some of the data input characteristics represent an entire history of interactions between the user 202 and the computing device 102.

The data input characteristics represent crowdsourced data 108. The cloud service 104 analyzes or otherwise processes the crowdsourced data 108 to produce one or more user groups 110. The user groups 110 are created based on a grouping, classification, clustering, categorizing, or other analysis of the data input characteristics to identify similarities and differences therein.

Each of the user groups 110 thus has particular data input characteristics associated therewith. For example, medical professionals may exhibit particular data input characteristics (e.g., medical language, abbreviations, etc.) and thus be grouped into a medical professionals user group. Each of the users 202 are matched or assigned to at least one of the user groups 110 by comparing the data input characteristics of the users 202 with the data input characteristics corresponding to each of the user groups 110. For example, users 202 exhibiting data input characteristics similar to those of the medical professionals user group may be matched to that group. While other examples contemplate a legal services user group, an engineering user group, a software user group, and the like, aspects of the disclosure are operable with any grouping, category, classification, or subclassification of the data input characteristics.

In some embodiments, a score, confidence factor, rating, or other metric is generated to determine a level of similarity between the data input characteristics of one of the users 202 and the data input characteristics of each of the user groups 110. Based on the score or other metric, at least one of the user groups 110 is chosen for association with the user 202.

For each of the user groups 110, the cloud service 104 generates input models 112 based on the data input characteristics associated with the assigned users 202 within the user groups 110. The input models 112 represent any logic, functionality, mapping, or the like that defines the interpretation of data entered by the users 202. For example, the input models 112 include language models 114 and/or touch models 116. In some embodiments, language models 114 represent a statistical model of language use to estimate the probability of an intended word or next character based on a partial set of characters entered by the users 202. Exemplary touch models 116 estimate the probability of an intended character giving a particular touch point, swipe, or gesture from the user 202. For example, the touch model 116 may represent a probability distribution over likely touch points mapped to keys or characters given an intention to press a particular character.

Figure 2:
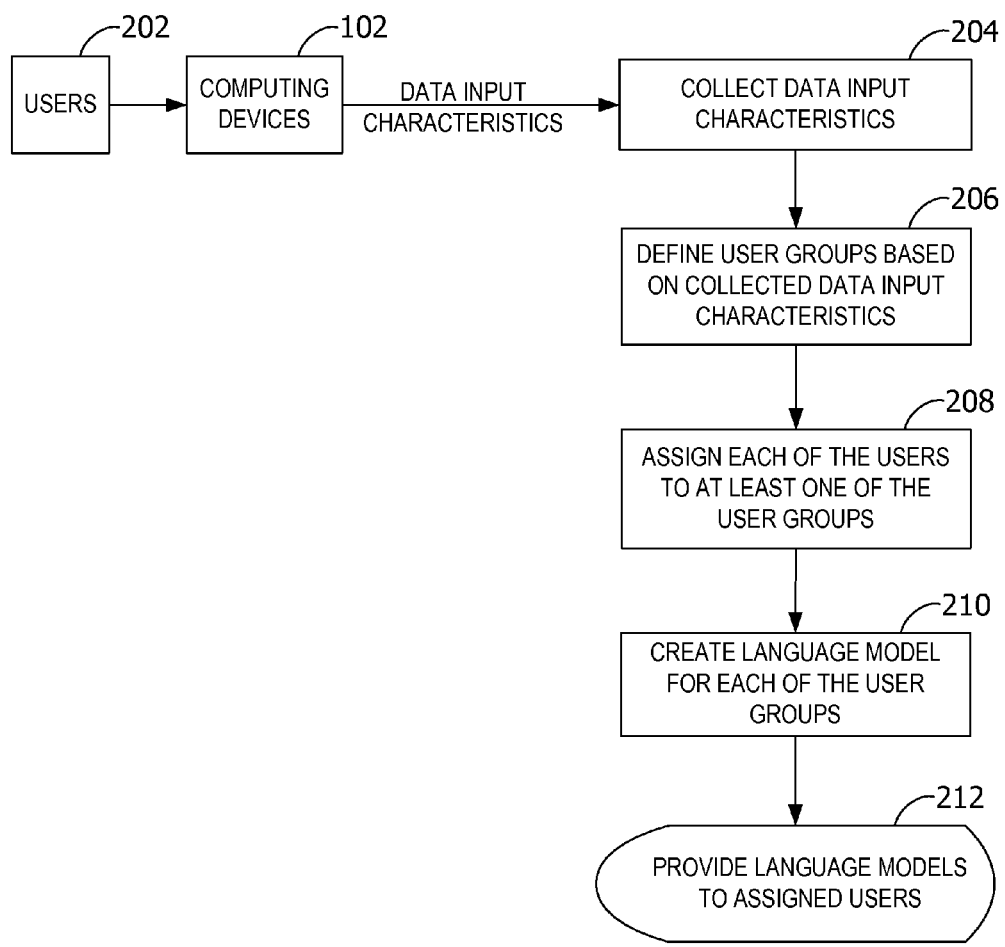
FIG. 2 is an exemplary flow chart illustrating the clustering of users and the creation of language models.

Referring next to FIG. 2, an exemplary flow chart illustrates the clustering of users 202 and the creation of language models 114. In some embodiments, the operations illustrated in FIG. 2 are performed by the cloud service 104. In other embodiments, the operations illustrated in FIG. 2 may be performed by the computing devices 102, such as a laptop or mobile telephone operated by a plurality of different users 202 over time.

The users 202 may enter data on the computing devices 102 in a plurality of ways. For example, the users 202 may enter data into a touch screen 304 and/or a keyboard (e.g., a virtual keyboard overlaid on the touch screen 304) using a stylus, finger, or other pointing mechanism. The users 202 may also provide audio (e.g., via a microphone) and/or video (e.g., via a camera) that can be processed to obtain data (e.g., speech-to-text conversion). The users 202 may also move the computing devices 102 in a particular way to enter data (e.g., via one or more accelerometers).

Each computing device 102 analyzes the data entry from the user(s) 202 of that computing device 102 to produce the data input characteristics. For example, an operating system and/or an application program executing on the computing devices 102 acts as a data logging tool to detect the data entry, analyze the data entry, and produce the data input characteristics. In some embodiments, the computing devices 102 provide the produced data input characteristics to the cloud service 104. For example, the computing devices 102 provide the data input characteristics as the data input characteristics are generated. In another example, the computing devices 102 provide the data input characteristics on a batch basis (e.g., nightly, weekly, every hour, etc.). In still another example, the computing devices 102 provide the data input characteristics responsive to a request from the cloud service 104 for the data input characteristics. In yet another example, the computing devices 102 may store the generated data input characteristics in a data store accessible by the cloud service 104. In such an example, the cloud service 104 obtains the data input characteristics at any time.

At 204, the cloud service 104 collects the data input characteristics from a plurality of users 202 of computing devices 102. At 206, the cloud service 104 defines a plurality of user groups 110 based on the collected data input characteristics, where each of the user groups 110 has at least a portion of the data input characteristics associated therewith. For example, the data input characteristics associated with one of the user groups 110 represent a derivation, calculation, or other function of the data input characteristics associated with the users 202 assigned to the user groups 110.

In some embodiments, the collected data input characteristics are clustered into user groups 110 by applying document clustering techniques to find clusters of language use. The clusters represent groups of users 202 with similar data input characteristics such as language use. For example, in each cluster, the users 202 use similar words or n-grams. Alternatively or in addition, the collected data input characteristics are clustered using unsupervised clustering methods such as k-nearest neighbor algorithms.

At 208, the cloud service 104 assigns each of the plurality of users 202 to at least one of the defined plurality of user groups 110 based on the data input characteristics collected from the user 202. At 210, the cloud service 104 creates a language model 114 for each of the defined plurality of user groups 110. Each language model 114 is created based on the data input characteristics used to define the user groups 110. For example, each language model 114 is created based on the data input characteristics collected from the users 202 assigned or associated with the user groups 110. At 212, the cloud service 104 provides the created language models 114 to the assigned users 202. For example, the language models 114 (and other input models 112) may be pushed to the users 202 dynamically as the users 202 are typing (e.g., an over-the-air wireless update). In another example, the language models 114 are pushed to the users 202 via an application marketplace, or when the computing device 102 is tethered to another computing device that has the input model 112.

Some embodiments contemplate further creating the touch models 116 for the user groups 110 based on the data input characteristics associated with the user groups 110. The cloud service 104 further provides the touch models 116 to the users 202 within the user groups 110.

The input models 112 may be created, or further personalized, for each application 308 executing on the computing device 102 and/or for each user 202 interacting with the computing device 102. For example, the data input characteristics of the user 202 may be weighted more heavily than the data input characteristics from other users 202 when defining the input models 112. The personalization may be performed by the cloud service 104, or by each computing device 102 after delivery to the user 202.

Figure 3:
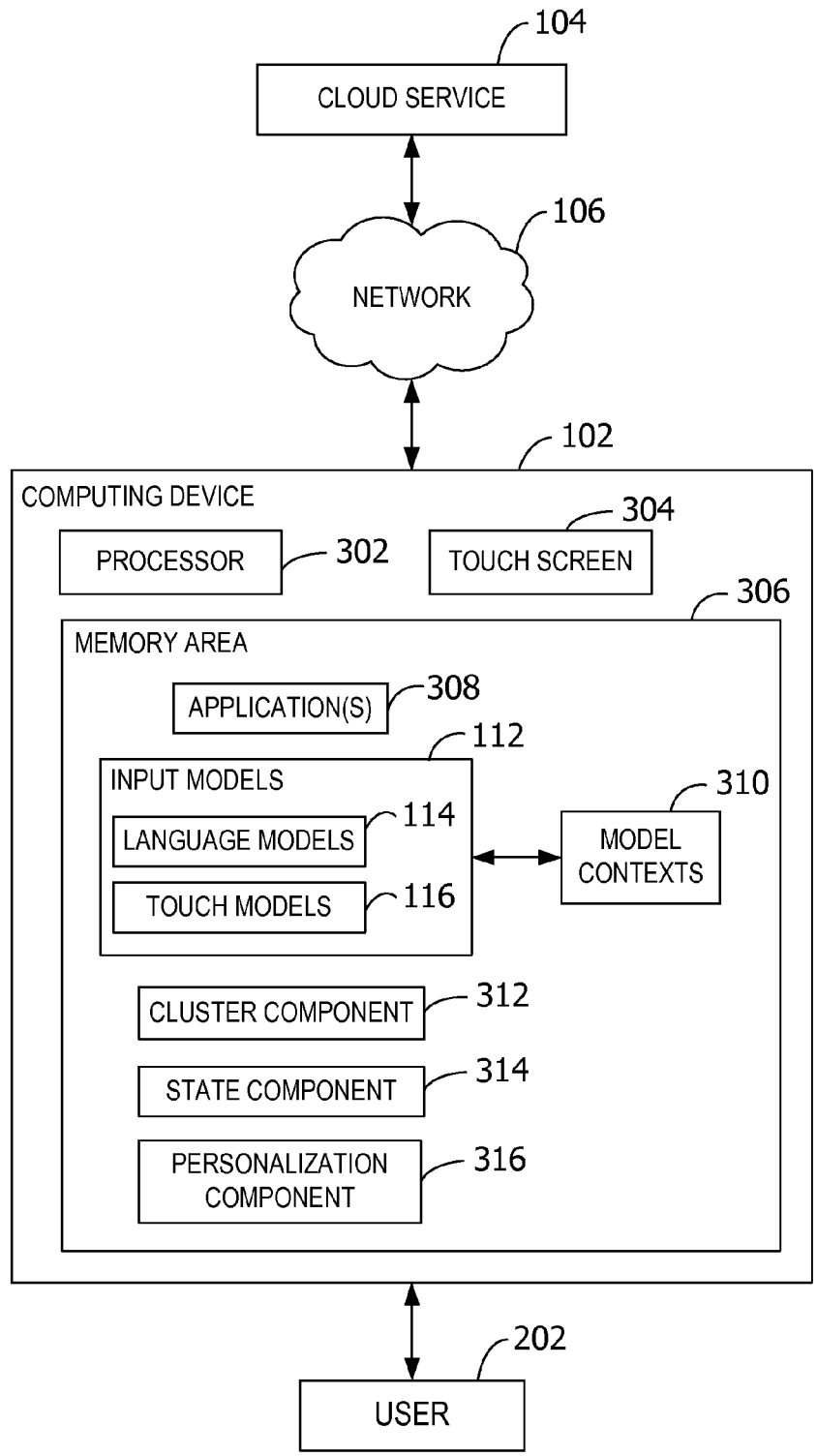
FIG. 3 is an exemplary block diagram illustrating a computing device adjusting interpretation of data input from a user based on input models.

Referring next to FIG. 3, an exemplary block diagram illustrates the computing device 102 adjusting interpretation of data input from the user 202 based on at least one of the input models 112. In the example of FIG. 3, the computing device 102 is associated with at least one user 202. The computing device 102 represents any device executing instructions (e.g., as application programs, operating system functionality, or both) to implement the operations and functionality associated with the computing device 102. The computing device 102 may include a mobile computing device 502 or any other portable device. In some embodiments, the mobile computing device 502 includes a mobile telephone, laptop, tablet, computing pad, netbook, gaming device, and/or portable media player. The computing device 102 may also include less portable devices such as desktop personal computers, kiosks, gaming consoles, and tabletop devices. Additionally, the computing device 102 may represent a group of processing units or other computing devices.

The computing device 102 has at least one processor 302, the touch screen 304, and a memory area 306. The processor 302 includes any quantity of processing units, and is programmed to execute computer-executable instructions for implementing aspects of the disclosure. The instructions may be performed by the processor 302 or by multiple processors executing within the computing device 102, or performed by a processor external to the computing device 102. In some embodiments, the processor 302 is programmed to execute instructions such as those illustrated in the figures (e.g., FIG. 4).

The computing device 102 further has at least one touch screen 304 for receiving data from the user 202 and/or providing data to the user 202. The touch screen 304 may represent a small portion of the computing device 102, or may consume a significant portion of one or more sides of the computing device 102. For example, the touch screen 304 may represent an entire side of the computing device 102 or an upper portion of a clamshell, lid, or other cover. In some embodiments, the touch screen 304 is any touch screen having capacitive and/or resistive touch sensors.

The computing device 102 further has one or more computer readable media such as the memory area 306. The memory area 306 includes any quantity of media associated with or accessible by the computing device 102. The memory area 306 may be internal to the computing device 102 (as shown in FIG. 3), external to the computing device 102 (not shown), or both (not shown).

The memory area 306 stores, among other data, one or more applications 308. The applications 308, when executed by the processor 302, operate to perform functionality on the computing device 102. Exemplary applications 308 include mail application programs, web browsers, calendar application programs, address book application programs, messaging programs, media applications, location-based services, search programs, and the like. The applications 308 may communicate with counterpart applications or services such as web services accessible via a network. For example, the applications 308 may represent downloaded client-side applications that correspond to server-side services executing in a cloud.

The memory area 306 further stores one or more of the input models 112 (e.g., language models 114, touch models 116, and the like). The input models 112 may have been received from, for example, the cloud service 104. Each of the input models 112 define and/or alter interpretation of input received from the user 202 of the computing device 102. Each of the input models 112 has a model context 310 associated therewith. The model context 310 describes the data input characteristics associated with the input model 112. In some embodiments, the model contexts 310 are derived from the data input characteristics of users 202 from which the input models 112 were created.

The memory area 306 further stores one or more computer-executable components. Exemplary components include a cluster component 312, a state component 314, and a personalization component 316. In some embodiments, the computing device 102 executes the components to perform operations, such as those illustrated in FIG. 2, to cluster the users 202. For example, the cluster component 312, when executed by the processor 302 of the computing device 102, causes the processor 302 to define a plurality of the user groups 110 based on data input characteristics collected from users 202 of the computing device 102 (or from other peer computing devices 102). The cluster component 312 further assigns each of a plurality of input models 112 to at least one of the defined plurality of user groups 110.

The state component 314, when executed by the processor 302 of the computing device 102, causes the processor 302 to detect a current context of the computing device 102. The current context represents at least a state of the computing device 102. An exemplary context may include applications 308 executing on the computing device 102, types of the executing applications 308, user activity on the computing device 102, and/or any of the data input characteristics described herein.

The personalization component 316, when executed by the processor 302 of the computing device 102, causes the processor 302 to select and apply at least one of the plurality of input models 112 to the computing device 102 during the context detected by the state component 314. The personalization component 316 selects the input model 112 based on the model contexts 310 and the current context detected by the state component 314. The applied input model 112 alters interpretation of input received from the user 202 via the computing device 102 while the computing device 102 remains in the detected context.

The personalization component 316 selects and applies the input model 112 by, for example, matching users 202 against clustered models 112. As described herein, the clustered models 112 are produced from clustering data from a plurality of users 202. The best matching model 112 for the user 202 is then re-parameterized or otherwise personalized or customized to the characteristics of the user 202. In general, personalization of the best fitting clustered model 112 in this manner allows fast selection and application of the personalized model 112 with less use of the characteristics of the user 202 (e.g., using less personal data).

In such an embodiment, the personalization component 316 matches the user 202 with one of the plurality of user groups 110, selects the input model 112 assigned to the matched one of the plurality of user groups 110, customizes the selected input model 112 based on the current context detected by the state component 314, and applies the customized input model 112 to the computing device 102 during the context detected by the state component 314 to alter interpretation of input received from the user 202 via the computing device 102.

In some embodiments, the computing device 102 further has a network interface card and/or computer-executable instructions (e.g., a driver) for operating the network interface card. The network interface card operates to exchange data with, for example, the cloud service 104. The computing device 102 may also include a graphics card and driver to operate the touch screen 304. The computing device 102 may also include other components and/or peripherals such as the following: speakers, a sound card, a camera, a microphone, a vibration motor, one or more accelerometers, a BLUETOOTH brand communication module, global positioning system (GPS) hardware, and a photoreceptive light sensor.

Figure 4:
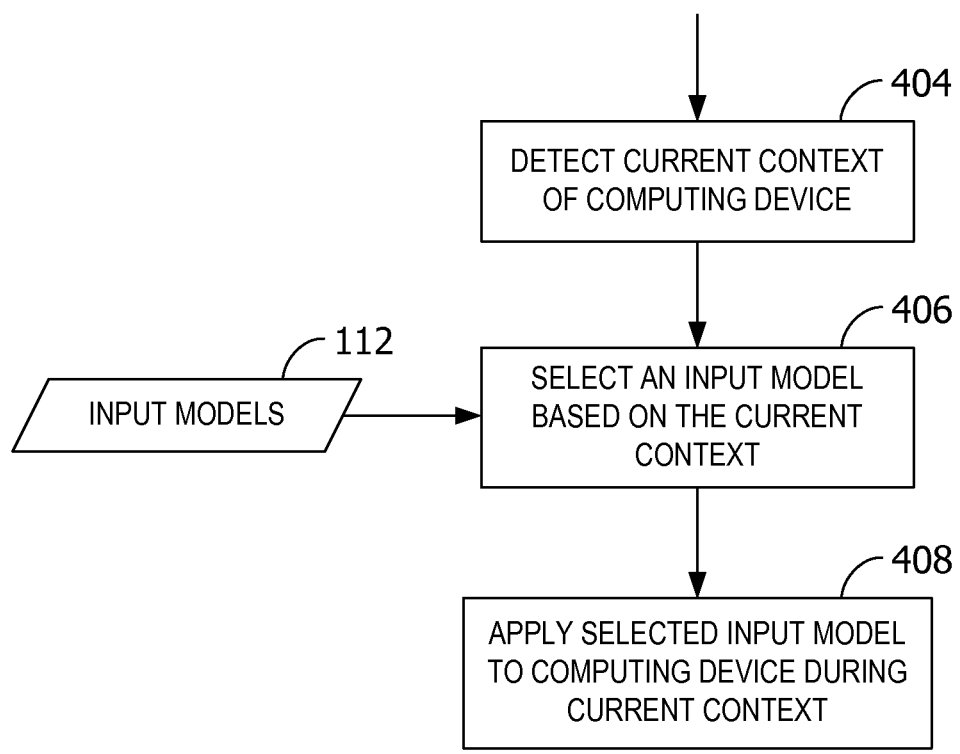
FIG. 4 is an exemplary flow chart illustrating the selection and application of input models based on a context of a computing device.

Referring next to FIG. 4, an exemplary flow chart illustrates the selection and application of input models 112 based on a context of the computing device 102. The operations illustrated in FIG. 4 may be executed by, for example, the computing device 102 illustrated in FIG. 3. In other embodiments, the operations illustrated in FIG. 4 may be executed by a device in communication with the computing device 102.

At 404, the computing device 102 detects a current context of the computing device 102. For example, the computing device 102 identifies the services and/or application programs executing on the computing device 102. The computing device 102 may also identify the user 202 of the computing device 102, and access a profile of the user 202. The profile may describe historical user activity on the computing device 102 and/or user preferences. The computing device 102 may further analyze a history of interactions between the user 202 and the computing device 102 when determining the context. The detected context represents a current state of the computing device 102.

At 406, the input model 112 is selected based on the current context. For example, the computing device 102 accesses a plurality of input models 112 and selects (e.g., at an operating system level) the input model 112 having a model context 310 that matches the current context. In another example, the computing device 102 may create one or more of the input models 112 based on historical data input characteristics collected from the user 202.

The computing device 102 may also select the input model 112 based on the user groups 110 to which the user 202 has been assigned. For example, the user 202 may be assigned to one of the user groups 110 based on the data input characteristics of the user 202.

At 408, the computing device 102 applies the selected input model 112 during the current context to define and/or alter interpretation of data input by the user 202 into the computing device 102.

Figure 5:
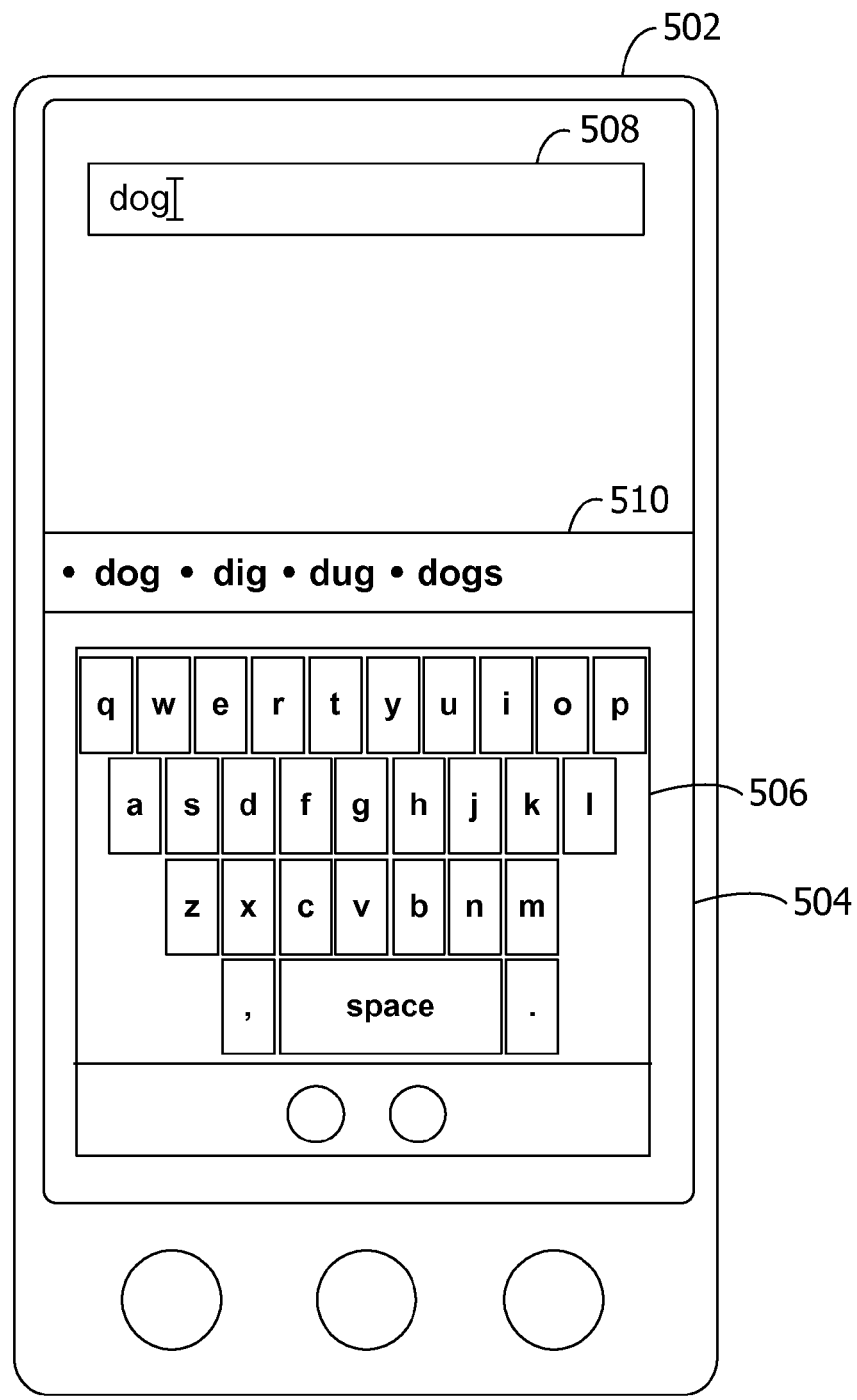
FIG. 5 is an exemplary mobile computing device illustrating the application of a language model to user input.

Referring next to FIG. 5, the exemplary mobile computing device 502 illustrates the application of a language model 114 to user input. In the example of FIG. 5, the user 202 has entered "dog" into a text entry box or field 508 in a user interface 504. The user 202 enters the data via a touch screen keyboard 506. The mobile computing device 502 generates a set 510 of suggested words based on the text entered by the user 202. The set 510 of suggested words is generated using the language model 114. For example, a different language model 114 may produce a different set 510 or ordering of suggested words. In this example, the mobile computing device 502 has generated the words "dog," "dig," "dug," and "dogs." The user 202 is able to select any of the suggested words and/or continue entering data. The set 510 of suggested words dynamically updates as the user 202 enters each character.

Figure 6:
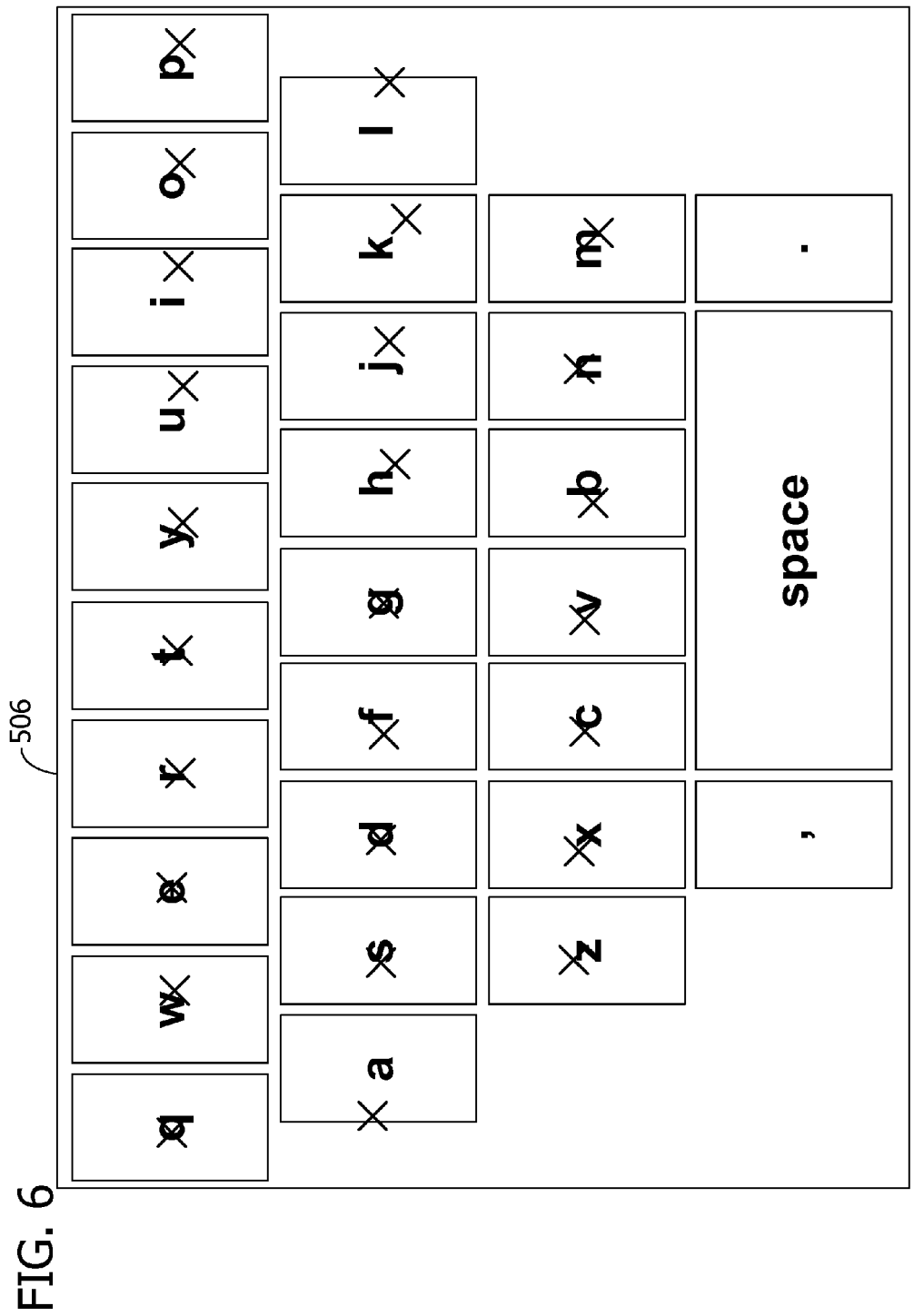
FIG. 6 is an exemplary touch screen keyboard illustrating application of a touch model to user input.

Referring next to FIG. 6, an exemplary touch screen keyboard 506 illustrates application of one of the touch models 116 to user input. In the example of FIG. 6, the touch screen keyboard 506 has "X" overlaid on each character to show the location of the average touch screen input corresponding to each intended character. For example, the "X" over each character represents the center point of the contact areas for that character. Application of the touch model 116 enables the computing device 102 to identify the intended character corresponding to a particular touch screen input from the user 202.

In other embodiments, rather than "X" representing average (x,y) coordinates, the contact area may be represented as an ellipsoid with a center, width, and height. Other representations are also within the scope of the disclosure.

ADDITIONAL EXAMPLES

In an example scenario, the data entry from the user 202 is handwriting (e.g., cursive or print). In such embodiments, the input models 112 created by the cloud service 104 interpret the handwriting input by recognizing stroke information and converting the strokes to characters. By associating the stroke information with characters, aspects of the disclosure create or enhance a handwriting recognition engine.

In some embodiments, the cloud service 104 adjusts the input models 112 for each of the user groups 110 as additional data input characteristics are received from users 202 assigned to the user groups 110. The data input characteristics for the input models 112 are updated with the received, additional data input characteristics (e.g., recently received data input characteristics). If the updated input models 112 are determined to represent an improvement over the current input models 112 (e.g., cross-validation), the cloud service 104 may push the updated input models 112 to the users 202. For example, the performance of the current input models 112 is evaluated and compared to the performance of the updated input models 112. Any metric for evaluating the performance of input models 112 is within the scope of the disclosure. If the performance of one of the updated input models 112 exceeds that of the corresponding current input model 112, the corresponding current input model 112 is replaced with the updated input model 112 (e.g., distributed to the users 202).

At least a portion of the functionality of the various elements in FIG. 1 and FIG. 3 may be performed by other elements in FIG. 1 and/or FIG. 3, or an entity (e.g., processor, web service, server, application program, computing device, etc.) not shown in FIG. 1 or FIG. 3.

In some embodiments, the operations illustrated in FIG. 2 and in FIG. 4 may be implemented as software instructions encoded on a computer readable medium, in hardware programmed or designed to perform the operations, or both. For example, aspects of the disclosure may be implemented as a system on a chip.

While no personally identifiable information is tracked by aspects of the disclosure, embodiments have been described with reference to data monitored and/or collected from users 202. In such embodiments, notice is provided to the users 202 of the collection of the data (e.g., via a dialog box or preference setting) and users 202 are given the opportunity to give or deny consent for the monitoring and/or collection. The consent may take the form of opt-in consent or opt-out consent.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible, exclude propagated data signals, and are mutually exclusive to communication media. In some embodiments, computer storage media are implemented in hardware. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, embodiments of the invention are operational with numerous other general purpose or special purpose computing system environments or configurations. Examples of well-known computing systems, environments, and/or configurations that may be suitable for use with aspects of the invention include, but are not limited to, mobile computing devices 502, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention transform a general-purpose computer into a special-purpose computing device when configured to execute the instructions described herein.

The embodiments illustrated and described herein as well as embodiments not specifically described herein but within the scope of aspects of the invention constitute exemplary means for dynamically selecting and applying input models 112 to the computing device 102 based on the current context of the computing device 102, and exemplary means for clustering data input characteristics of a plurality of users 202 to create each of the plurality of input models 112.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A system for the dynamic and contextual selection and application of language models and/or touch models for a computing device, said system comprising:
   a memory area associated with a computing device of a user, said memory area storing a plurality of input models each defining interpretation of input received from the user, each of the plurality of input models further having a model context associated therewith; and
   a processor programmed to:
      detect a current context of the computing device, said detected current context representing at least a state of the computing device;
      select, based on the detected current context and the model contexts stored in the memory area, at least one of the plurality of input models stored in the memory area; and
      apply the selected at least one of the plurality of input models to the computing device during the detected context to alter the interpretation of input received from the user via the computing device.

2. The system of claim 1, wherein the plurality of input models comprise one or more of the following: a language model and a touch model.

3. The system of claim 1, wherein altering the interpretation of input received from the user comprises suggesting one or more words based on the input received and the selected input model.

4. The system of claim 1, wherein the processor is programmed to select, at an operating system level, the at least one of the plurality of input models.

5. The system of claim 1, wherein the processor is programmed to detect the current context of the computing device by identifying at least one application program executing on the computing device.

6. The system of claim 1, wherein the processor is programmed to detect the current context of the computing device by analyzing a history of interactions between the user and the computing device.

7. The system of claim 1, wherein the processor is further programmed to assign the user to at least one of a plurality of user groups, wherein the plurality of user groups are defined based on data input characteristics of a plurality of users.

8. The system of claim 7, wherein the processor is programmed to select the at least one of the plurality of input models based on the assigned at least one of the plurality of user groups.

9. The system of claim 1, further comprising means for dynamically selecting and applying input models to the computing device based on the current context of the computing device.

10. The system of claim 1, further comprising means for clustering data input characteristics of a plurality of users to create each of the plurality of input models.

11. A method comprising:
   collecting data input characteristics from a plurality of users of computing devices;
   defining a plurality of user groups based on the collected data input characteristics;
   assigning each of the plurality of users to at least one of the defined plurality of user groups based on the data input characteristics collected from the user;
   creating a language model for each of the defined plurality of user groups based on the data input characteristics collected from the users assigned thereto; and
   providing the created language models to the assigned plurality of users.

12. The method of claim 11, wherein collecting the data input characteristics comprises collecting one or more of the following: words entered by the users, characters entered by the users, strokes entered by the user, applications executed by the users, touch point data, and data entry speed.

13. The method of claim 11, wherein each of the defined plurality of user groups has at least a portion of the data input characteristics associated therewith.

14. The method of claim 13, wherein assigning each of the plurality of users to the at least one of the defined plurality of user groups comprises comparing the data input characteristics of each of the plurality of users to the at least a portion of the data input characteristics associated therewith.

15. The method of claim 11, further comprising creating a touch model for each of the defined plurality of user groups based on the data input characteristics collected from the users assigned thereto.

16. The method of claim 15, further comprising providing the created touch models to the assigned plurality of users.

17. The method of claim 11, further comprising:
 creating updated language models based on recently collected data input characteristics; and
 evaluating the created language models against the provided language models to determine whether to replace the provided language models.

18. One or more computer storage media embodying computer-executable components, said components comprising:
 a cluster component that when executed causes at least one processor to define a plurality of user groups based on data input characteristics collected from users, the cluster component further assigning each of a plurality of input models to at least one of the defined plurality of user groups, each of the plurality of input models having a model context associated therewith;
 a state component that when executed causes at least one processor to detect a current context of a computing device of a user, said detected current context representing at least a state of the computing device; and
 a personalization component that when executed causes at least one processor to select, based on the model contexts and the current context detected by the state component, and apply at least one of the plurality of input models to the computing device during the context detected by the state component to alter interpretation of input received from the user via the computing device.

19. The computer storage media of claim 18, wherein the personalization component selects and applies the at least one of the plurality of input models to the computing device by:
 matching the user with one of the plurality of user groups;
 selecting the input model assigned to the matched one of the plurality of user groups;
 customizing the selected input model based on the current context detected by the state component; and
 applying the customized input model to the computing device during the context detected by the state component to alter interpretation of input received from the user via the computing device.

20. The computer storage media of claim 18, wherein the current context includes data input characteristics of the user, and wherein the cluster component performs a document clustering algorithm using the data input characteristics as input.

* * * * *